(12) United States Patent
Fritz et al.

(10) Patent No.: US 9,096,977 B2
(45) Date of Patent: Aug. 4, 2015

(54) MILLING MACHINE WITH LOCATION INDICATOR SYSTEM

(71) Applicant: Wirtgen GmbH, Windhagen (DE)

(72) Inventors: Matthias Fritz, Linz/Rhein (DE); Christian Berning, Brühl (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 13/901,263

(22) Filed: May 23, 2013

(65) Prior Publication Data

US 2014/0348584 A1    Nov. 27, 2014

(51) Int. Cl.
*E01C 23/088*    (2006.01)

(52) U.S. Cl.
CPC .................... *E01C 23/088* (2013.01)

(58) Field of Classification Search
CPC ..................................................... E01C 23/088
USPC ........................................ 404/84.05–84.8, 75
See application file for complete search history.

(56) References Cited

U.S. PATENT DOCUMENTS

| | | |
|---|---|---|
| 5,288,167 A | 2/1994 | Gaffard et al. |
| 5,519,620 A | 5/1996 | Talbot et al. |
| 5,549,412 A | 8/1996 | Malone |
| 5,612,864 A | 3/1997 | Henderson |
| 5,631,658 A | 5/1997 | Gudat et al. |
| 5,838,277 A | 11/1998 | Loomis et al. |
| 5,929,807 A | 7/1999 | Viney et al. |
| 6,027,282 A | 2/2000 | Horn |
| 6,047,227 A | 4/2000 | Henderson et al. |
| 6,074,693 A | 6/2000 | Manning |
| 6,088,644 A | 7/2000 | Brandt et al. |

(Continued)

FOREIGN PATENT DOCUMENTS

| | | |
|---|---|---|
| DE | 19750315 A1 | 5/1998 |
| DE | 29918747 U1 | 2/2000 |

(Continued)

OTHER PUBLICATIONS

Co-pending U.S. Appl. No. 13/756,646, filed Feb. 1, 2013 for "Self-Propelled Civil Engineering Machine Systems With Field Rover".

(Continued)

*Primary Examiner* — Raymond W Addie
(74) *Attorney, Agent, or Firm* — Lucian Wayne Beavers; Patterson Intellectual Property Law, PC (57) ABSTRACT

A construction machine apparatus includes a plurality of ground engaging supports, a machine frame supported from the ground engaging supports and a milling drum supported from the machine frame. A milling drum location detection system is configured to determine a drum location in an external reference system. A location indicator system includes a memory configured to store information identifying a location of one or more areas to be avoided in the external reference system, and a controller configured to compare the drum location to the location of the one or more areas to be avoided, and to provide an output corresponding to a proximity of the milling drum to the location of the one or more areas to be avoided.

39 Claims, 8 Drawing Sheets

(56) References Cited

U.S. PATENT DOCUMENTS

| | | | |
|---|---|---|---|
| 6,113,309 A | 9/2000 | Hollon et al. | |
| 6,140,957 A | 10/2000 | Wilson et al. | |
| 6,144,318 A | 11/2000 | Hayashi et al. | |
| 6,152,648 A * | 11/2000 | Gfroerer et al. | 404/84.05 |
| 6,191,732 B1 | 2/2001 | Carlson et al. | |
| 6,287,048 B1 | 9/2001 | Hollon et al. | |
| 6,371,566 B1 | 4/2002 | Haehn | |
| 6,425,186 B1 | 7/2002 | Oliver | |
| 6,481,924 B1 | 11/2002 | Smolders et al. | |
| 6,655,465 B2 | 12/2003 | Carlson | |
| 6,736,216 B2 | 5/2004 | Savard | |
| 6,769,836 B2 | 8/2004 | Lloyd | |
| 6,916,070 B2 * | 7/2005 | Sehr | 299/1.5 |
| 6,950,059 B2 | 9/2005 | Rapoport | |
| 7,002,513 B2 | 2/2006 | Brabec | |
| 7,029,199 B2 * | 4/2006 | Mayfield et al. | 404/84.05 |
| 7,363,154 B2 | 4/2008 | Lindores | |
| 7,399,139 B2 | 7/2008 | Kieranen | |
| 7,443,167 B2 * | 10/2008 | Siegel et al. | 324/329 |
| 7,491,014 B2 | 2/2009 | Sick | |
| 7,510,347 B2 * | 3/2009 | Lemke | 404/84.5 |
| 7,530,641 B2 | 5/2009 | Berning et al. | |
| 7,617,061 B2 | 11/2009 | Brabec | |
| 7,643,923 B2 | 1/2010 | Buehlmann et al. | |
| 7,856,302 B2 * | 12/2010 | Rasmussen | 701/50 |
| 7,946,787 B2 | 5/2011 | Glee et al. | |
| 7,946,788 B2 * | 5/2011 | Jurasz et al. | 404/84.8 |
| 8,018,376 B2 | 9/2011 | McClure | |
| 8,174,437 B2 | 5/2012 | Whitehead | |
| 8,246,270 B2 | 8/2012 | Berning et al. | |
| 8,271,194 B2 | 9/2012 | Whitehead | |
| 8,388,263 B2 | 3/2013 | Fritz et al. | |
| 8,613,566 B2 | 12/2013 | Fritz et al. | |
| 2004/0057795 A1 | 3/2004 | Mayfield et al. | |
| 2004/0193348 A1 | 9/2004 | Gray et al. | |
| 2008/0208417 A1 | 8/2008 | Buehlmann et al. | |
| 2008/0253834 A1 | 10/2008 | Colvard | |
| 2009/0016818 A1 * | 1/2009 | Hall et al. | 404/75 |
| 2010/0023229 A1 | 1/2010 | Chiocco | |
| 2011/0150572 A1 | 6/2011 | Fritz et al. | |
| 2011/0206456 A1 * | 8/2011 | Jurasz et al. | 404/75 |
| 2011/0229264 A1 | 9/2011 | Weiser | |
| 2012/0001621 A1 * | 1/2012 | Hall et al. | 324/207.13 |
| 2012/0001638 A1 * | 1/2012 | Hall et al. | 324/345 |
| 2012/0101725 A1 | 4/2012 | Kondekar | |
| 2012/0301220 A1 | 11/2012 | Snoeck et al. | |
| 2014/0081532 A1 | 3/2014 | Fritz et al. | |

FOREIGN PATENT DOCUMENTS

| | | |
|---|---|---|
| DE | 69131837 T2 | 6/2000 |
| DE | 102010014695 A1 | 10/2011 |
| EP | 1103659 A2 | 5/2001 |
| EP | 1118713 A1 | 7/2001 |
| EP | 2336424 A2 | 6/2011 |
| WO | 9203701 A1 | 3/1992 |

OTHER PUBLICATIONS

European Search Report in European Patent Application EP 14 16 8749, dated Sep. 19, 2014, 2 pp.

* cited by examiner

MILLING MACHINE WITH LOCATION INDICATOR SYSTEM

BACKGROUND OF THE INVENTION

1. Field of the Invention

The present invention relates generally to construction machines of the type including a milling drum supported from a machine frame, including milling machines, surface miners, recyclers, stabilizer machines, and the like.

2. Description of the Prior Art

During the milling of a large road surface area, it is common to use a large milling machine, such as a half lane milling machine, to mill the vast majority of the area of the road surface, leaving only small remainder areas which cannot be engaged by the large milling machine. Those small remainder areas are then later milled by a smaller, more maneuverable milling machine.

When performing a milling operation such as milling the surface of a road, or other ground surface, there are often areas of the road surface which must be avoided by the milling drum in order to prevent damage to the milling drum and/or to the area of the road surface in question. Such areas which it is desirable to avoid with the milling drum may for example include manhole covers, drain gratings, hydrant covers, and in general any area which would be damaged by the milling drum or which poses a threat of damage to the milling drum, or which for any other reason is not to be milled.

Thus, for example, in the process of milling a road, when the milling drum approaches the location of a manhole cover, it is desirable to mill to a location near to the manhole cover, then to raise the drum and pass it over the manhole cover then lower the drum back into milling contact with the road surface.

Current practice for dealing with such obstacles is generally as follows:

1. A milling machine operator or driver and a ground operator work as a team. The ground operator walks along beside the milling machine, and will visually look for the obstacles such as manhole covers in the path of the milling machine. The ground operator will mark the location of the obstacles by spraying lines on the ground with a highly visible paint. The ground operator and an assistant operator will typically pull a string perpendicular to the path of the milling machine at the beginning edge and ending edge of the obstacle, and will paint straight lines parallel to the string laterally out to the side of the machine path so that the lines are visible when the obstacle disappears beneath the milling machine.
2. Then the ground observer must determine where the location of the forward cutting edge of the milling drum is within the drum housing. It will be appreciated that as the milling depth increases, the effective cutting length of the milling drum in the direction of travel increases and thus the location of the intersection of the milling drum with the road surface moves forward relative to the side plate of the milling drum housing. Typical milling machines have a pictorial chart displayed on each sideplate of the milling drum housing that indicates where the forward cutting edge of the drum is located for various milling depths. This is indicated by reference to various bolts or other features near the lower edge of the sideplate. With this chart the ground observer identifies where the forward cutting edge of the milling drum is located within the drum housing.
3. The ground operator will warn the milling machine driver when an obstacle is near. Then the ground operator will communicate to the milling machine driver when advancement of the milling machine should stop. This communication is typically performed by hand signals. The decision by the ground operator as to when to stop advancement of the milling machine is a subjective judgment, and the ground operator must err on the side of avoiding contact of the milling drum with the obstacle. Because of the uncertainties in this existing procedure, the ground operator will typically instruct the milling machine operator to stop milling earlier than is actually necessary to avoid contact with the obstacle. This results in an increased remainder area which must later be milled at higher cost by a smaller, more maneuverable milling machine.
4. Upon receiving the signal to stop, the milling machine driver will stop advancement of the milling machine and raise the milling drum. The milling machine driver then again advances the milling machine with the drum raised until the ground operator again signals the milling machine driver to stop and to lower the milling drum back into milling engagement with the ground. This second decision by the ground operator is again a subjective one, and care must be used to avoid lowering the milling drum too early and hitting the back edge of the obstacle.

There are several difficulties encountered in the process just described. One difficulty is the inability of the ground observer to actually see either the obstacle or the milling drum, and thus the requirement for a subjective judgment to be made as to when to raise and when to lower the milling drum. Another difficulty is the communication between the milling machine driver and the ground operator due to noise and other adverse conditions at the job site. Both of these difficulties are increased when the milling job is being done at night, which makes it even harder for the ground observer to locate obstacles, and for the ground observer and the milling machine driver to communicate with hand signals.

As a result of these difficulties there is a lack of consistency in performance by various operator teams in milling close to obstacles. The end result is greatly dependent upon the skill and experience of the operator team. Some teams may be able to consistently mill within a couple of inches of obstacles without striking the obstacle. Other teams may leave as much as ten inches or more of un-milled material on either side of an obstacle and/or may repeatedly damage equipment by striking obstacles.

Thus there is a need for an improved system for avoiding obstacles or areas which are not to be milled during the operation of a large milling machine.

SUMMARY OF THE INVENTION

In one embodiment a construction machine apparatus comprises a plurality of ground engaging supports, a machine frame supported from the ground engaging supports, and a milling drum supported from the machine frame. A milling drum location detection system is provided and configured to determine a drum location of the milling drum in an external reference system. A location indicator system includes a memory configured to store information identifying a location of an area to be avoided in the external reference system. The location indicator system also includes a controller configured to compare the drum location to the location of the area to be avoided, and to provide an output corresponding to a proximity of the milling drum to the location of the area to be avoided.

In another embodiment a method is provided for milling a ground surface. The method may include the steps of:

(a) storing in a controller information identifying in an external reference system a location of an area to be avoided;

(b) advancing a milling machine;

(c) determining a drum location of a milling drum of the milling machine in the external reference system as the milling machine advances;

(d) comparing in the controller the drum location to the location of the area to be avoided; and (e) providing from the controller an output corresponding to a proximity of the drum location to the location of the area to be avoided.

In any of the above embodiments, the output corresponding to a proximity of the drum location to the location of the area to be avoided can be an indication provided to the milling machine operator.

In any of the above embodiments, the output corresponding to a proximity of the drum location to the location of the area to be avoided can be a control signal to automatically stop advancement of the milling machine if the drum location is within a selected range of the location of the area to be avoided.

In any of the above embodiments, the output corresponding to a proximity of the drum location to the location of the area to be avoided can be a control signal to automatically raise the milling drum of the milling machine if the drum location is within a selected range of the location of the area to be avoided.

In any of the above embodiments, a field rover may be provided and configured to gather the information identifying the location of the area to be avoided in the external reference system. The field rover may either be completely separate from the milling machine, or may be removably attachable to the milling machine and configured such that when the field rover is attached to the milling machine the field rover comprises a part of the milling drum location detection system.

In any of the above embodiments, the controller may include an input configured to receive from the field rover information identifying the location of the area to be avoided. The input may be a port for a memory stick, an interface for a wired connection, or the input may be a wireless input.

In any of the above embodiments, the milling drum location detection system may be configured such that the milling drum location corresponds to a portion of the milling drum at an elevation corresponding to an elevation of the location of the area to be avoided. This elevation will typically be the surface elevation of the ground surface being milled. The intersection of the milling drum with the ground surface at the surface elevation defines a rectangular footprint which includes a forward cutting line, a rearward cutting line and two side lines of the milling drum. The portion of the milling drum of concern may be any of these four lines depending upon the operation being performed.

In any of the above embodiments, the area to be avoided may be of any shape. The area may be defined as one side of a straight line. The straight line may for example be a starting line for a milling operation or a finish line for the milling operation. The area to be avoided may be a circle. The area to be avoided may be a multi-sided shape defined by locations of multiple corners.

In any of the above embodiments, the controller may include a graphic visual display depicting the proximity of the milling drum to the location of the area to be avoided.

In any of the above embodiments, the controller may include an audible warning indicator configured to provide an audible warning to the machine operator if the drum location is within a selected range of the location of the area to be avoided.

In any of the above embodiments, the controller may include a visual warning indicator configured to provide a visual warning to the machine operator if the drum location is within a selected range of the location of the area to be avoided.

In any of the above embodiments, the milling drum location detection system may include a GNSS receiver for decoding satellite signals from a global navigation satellite system.

In any of the above embodiments, the milling drum location detection system may include a sensor or other operational component belonging to a non-satellite measuring system.

In any of the above embodiments, the controller may include a range selection component configured so that an operator may select a default clearance for all areas to be avoided.

In any of the above embodiments, the range selection component may be configured so that an operator can also select individual clearances for any selected area to be avoided.

In any of the above embodiments, the range selection component may include an automatic integration component so that if a separation between two areas to be avoided is less than a preset multiple of the combined clearances of the two areas, the two areas are combined into one larger area.

In any of the above embodiments, the controller may include a remainder determination component configured to record a path milled by the milling drum, the locations of the areas to be avoided and the locations of un-milled areas corresponding to locations where the milling drum is raised to avoid the areas to be avoided. This permits a record to be provided of locations of areas remaining to be milled after passage of the large milling machine apparatus.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 2 shows the milling drum cutting at a deeper milling depth.

DETAILED DESCRIPTION

Figure 2:
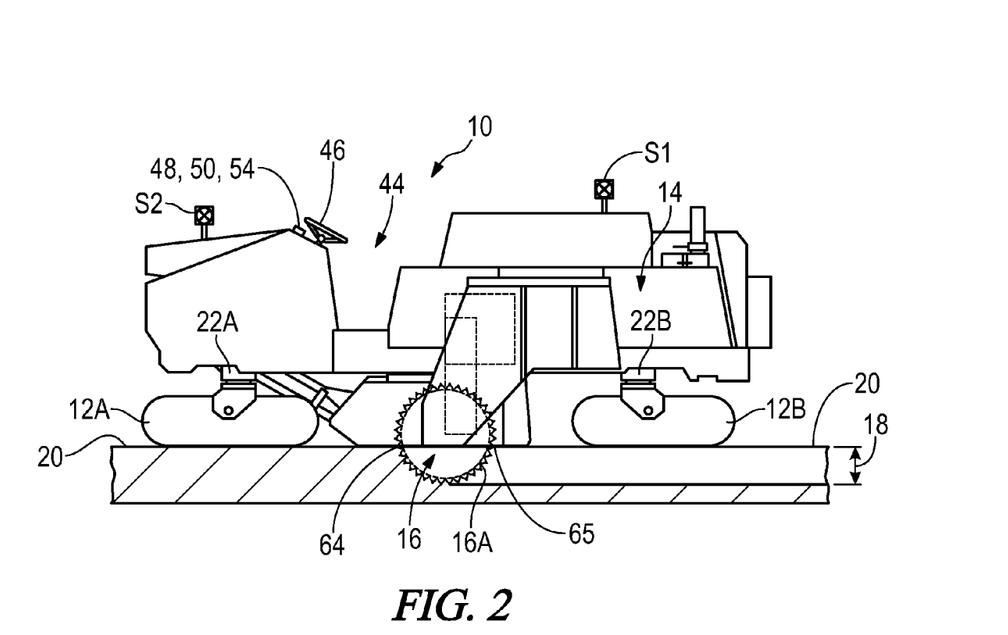
FIG. 2 is a schematic side elevation view of a large road milling machine of the type where the milling drum depth is adjusted by raising and lowering the machine frame which has the milling drum rigidly attached thereto for vertical movement therewith.
Figure 3:
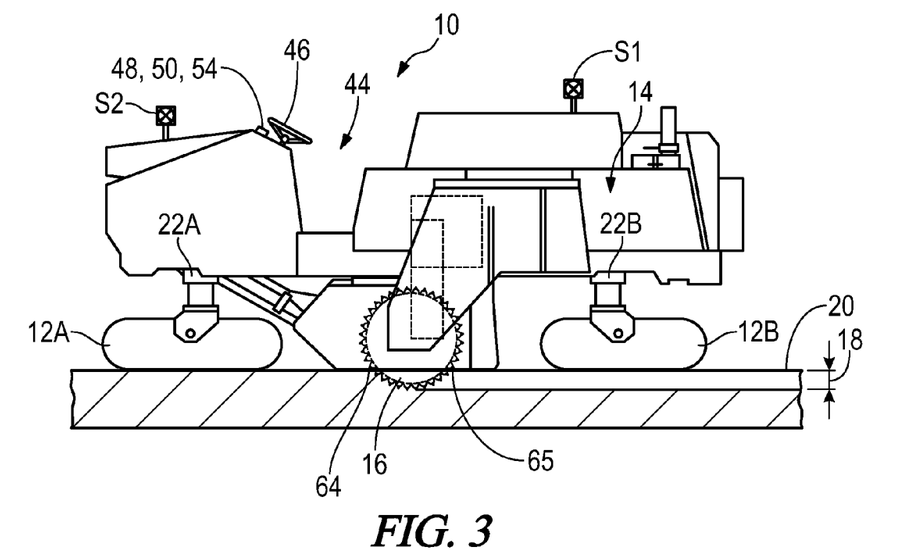
FIG. 3 is a schematic side elevation view of the milling machine of FIG. 2, showing the milling drum cutting at a lesser milling depth.

Referring now to FIGS. 2 and 3, a first embodiment of a construction machine apparatus 10 in the form of a large milling machine for road milling is there shown. The milling machine 10 includes a plurality of ground engaging supports such as front tracks 12A and rear tracks 12B, and a machine frame 14 supported from the ground engaging supports 12A and 12B.

A milling drum 16 is supported from the machine frame. A milling depth 18 of the milling drum 16 into the ground below ground surface 20 is determined by extending and contracting hydraulic rams 22A and 22B associated with the tracks 12A and 12B.

In FIG. 2 the milling depth 18 is shown at a relatively large depth. In FIG. 3, the hydraulic rams 22A and 22B have been extended to raise the milling drum 16 so that the milling depth 18 is reduced.

Figure 4:
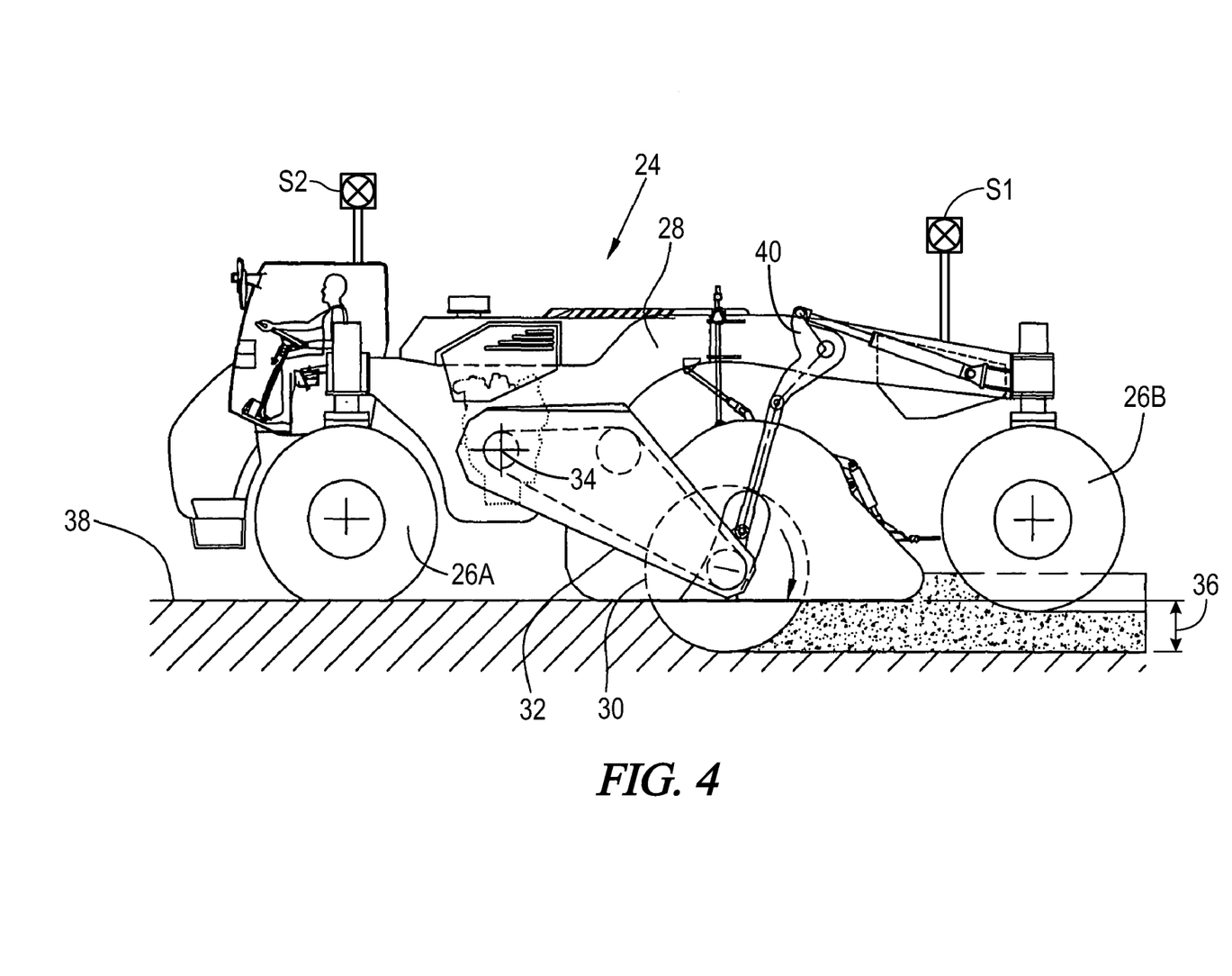
FIG. 4 is a schematic side elevation view of a construction machine of the recycler or stabilizer type wherein the milling depth of the milling drum is adjusted by raising and lowering the milling drum relative to the machine frame.

FIG. 4 is a schematic side elevation view of a construction machine of the recycler or soil stabilizer type generally designated by the numeral 24. The construction machine 24 includes a plurality of ground engaging supports in the form of front and rear wheels 26A and 26B. A machine frame 28 is supported from the ground engaging supports 26A and 26B. A milling drum 30 is supported from the frame 28 on pivotable arms 32 which pivot about a pivot axis 34. Thus a milling depth 36 of the drum 30 below a ground surface 38 is controlled by raising and lowering the drum 30 on the pivot arms 32 via a lifting mechanism 40.

Figure 5:
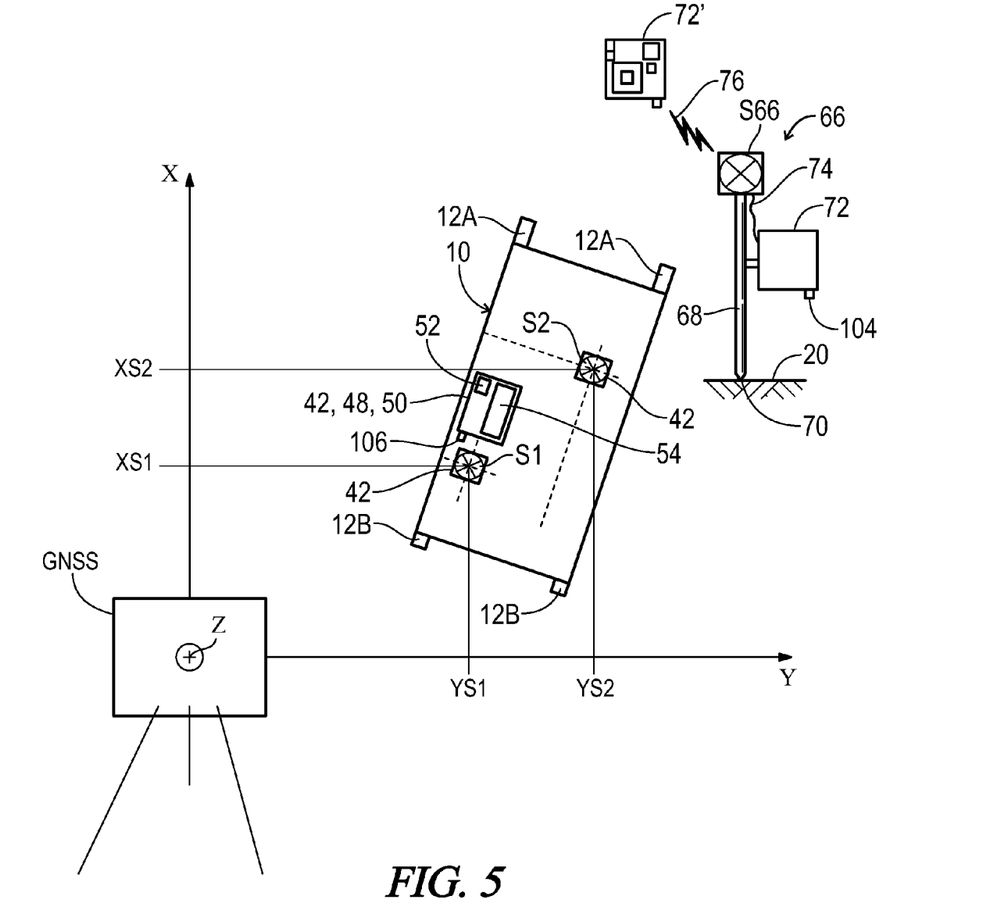
FIG. 5 is a schematic plan view of the milling machine of FIG. 2, and its milling drum location detection system and location indicator system, including a separate rover.

FIG. 5 shows the milling machine 10 of FIGS. 2 and 3 schematically together with a Cartesian reference system, independent of and external to the milling machine 10. The Cartesian reference system is illustrated as the measurement coordinate system (X, Y, Z). The measurement coordinate system (X, Y, Z) may be selected at random, and it remains in the same position and orientation as the milling machine 10 moves through it.

The milling machine 10 includes a milling drum location detection system generally designated by the numeral 42. The purpose of the milling drum location detection system 42 is to determine the location of the milling machine 10 and thus the location of the milling drum 16 which is carried by the milling machine 10, in the external reference system (X, Y, Z).

In one embodiment, the position and orientation of the milling machine 10 and thus of the milling drum 16 are determined using a satellite based global navigation satellite system (GNSS). In particular, because of the requirements for accuracy with which position and orientation are determined, what is preferably used is that satellite based global navigation satellite system which is known as the differential global navigation satellite system (DGNSS). The DGNSS method of determining orientation is based in this case on the measurement of the position by two DGNSS receivers which are arranged at different points S1 and S2 on the milling machine 10 as seen in FIG. 5. Alternatively a single DGNSS or GNSS receiver can be used, and the direction of machine travel can be determined once the machine begins moving forward, thus providing both the location and orientation of the machine.

The milling machine 10 has a driver's station 44 (see FIG. 2) from which the machine operator controls the operation of the milling machine 10. The operator may manually steer the milling machine 10 via steering system 46 which controls the direction of the driving tracks 12A and/or 12B. A controller 48 is located on the milling machine 10 and will interact with the milling drum location detection system 42 in the manner further described below. The controller 48 is part of a location indicator system 50 which includes the controller 48, a memory 52, and a display and input station 54 (see FIG. 7).

The GNSS system provides location data in three dimensions, X, Y, and Z. The system described below, however, may operate using only the X and Y data to locate the milling machine in the plane of the ground surface. The elevation data is not needed, because as described below the vertical location of the milling drum relative to the surface to be milled may be readily determined by other means, and those data are utilized to determine the vertical location of the milling drum relative to the various obstacles or other areas on the ground surface which are to be avoided. However in a more general aspect of the invention, elevation data from the GNSS system or any other positioning system could be utilized in addition to the X and Y position information.

Also, instead of a satellite based positioning system, the position of the milling machine 10 and the various other obstacles and objects discussed below, may be determined using a non-satellite terrestrial measuring system, such as for example a total station.

As is further described below, the milling drum location detection system 42 is configured to determine a drum location of the milling drum 16 in the external reference system (X, Y, Z). The location indicator system 50 includes the memory 52 and the display and input station 54. The memory 52 is configured to store information identifying a location of an area to be avoided in the external reference system (X, Y, Z), such area to be avoided for example being a manhole cover or the like. The controller 48 is configured to compare the drum location to the location of the area to be avoided, and to provide an output corresponding a proximity of the milling drum 16 to the location of the area to be avoided. That output may be a visual or an audible indication provided to a milling machine operator, so that the operator may then react to the indication and take appropriate action to avoid the obstacle. That output may alternatively be a control signal operable to automatically stop the milling machine or to automatically raise the milling drum.

Figure 1:
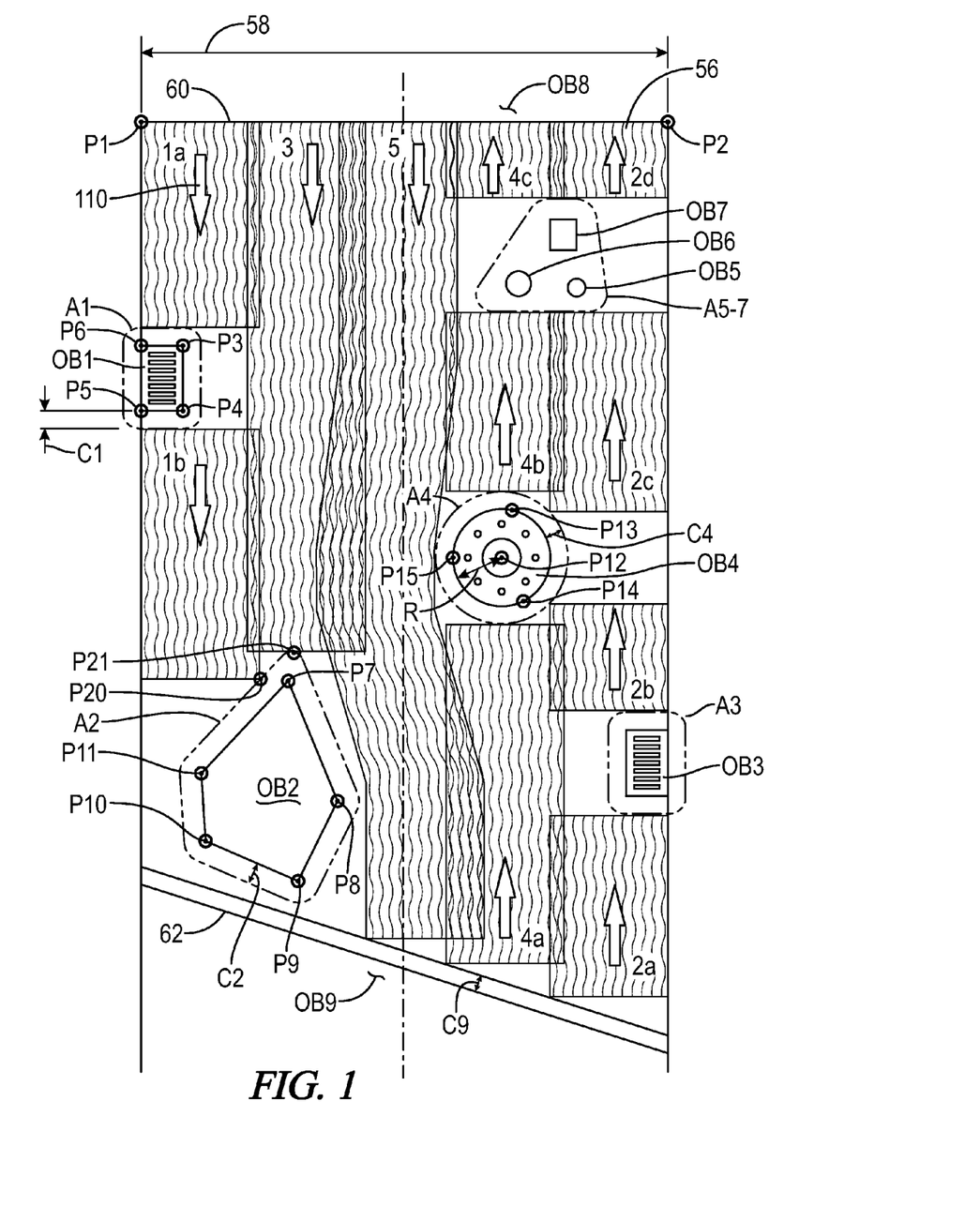
FIG. 1 is a schematic plan view of a length of a road, with numerous obstacles and areas to be avoided located in the road, and showing the various passes of a milling machine and where the milling machine is raised and lowered to pass over the areas to be avoided.

For example, FIG. 1 schematically illustrates a plan view of a length of road 56 which is to have its surface milled away in a series of passes by the milling machine 10. In the example of FIG. 1, the roadway 56 has a width 58 which is going to require the milling machine 10 to make approximately five parallel passes along the length of the roadway to mill the entire width of the roadway.

In FIG. 1, a number of obstacles to be avoided during the milling operation have been identified as OB1, OB2, OB3, OB4, OB5, OB6, and OB7. Each of these objects or objects to be avoided is shown schematically and they are intended to represent various types of obstacles or objects that may be encountered during the milling operation.

For example, obstacle OB1 represents a drain grating of generally rectangular shape located near one edge of the road. Obstacle OB2 is a polygonal or multi-sided area of arbitrary shape. Obstacle OB3 is another drain grate of generally rectangular shape located near the opposite side of the road 56. Obstacle OB4 represents a circular manhole cover. Obstacles OB5, OB6 and OB7 represent a cluster of objects such as hydrant covers in near proximity to each other, which as further described below can be treated by the controller 48 as a single area to be avoided which contains the entire cluster of objects OB5, OB6 and OB7.

The obstacles illustrated are only examples. Other types of milling machine operations might encounter different obstacles. For example, in a surface mining operation there are sometimes "hard spots" located within the mineral deposits being mined. An irregular shaped "hard spot" might be identified similar to obstacle OB2 shown in FIG. 1, and the surface miner could avoid the "hard spot" which might be left for subsequent removal by blasting or other techniques.

FIG. 1 also schematically shows the location of a sequence of milling passes to be performed by the milling machine which passes are sequentially identified as 1a, 1b, 2a, 2b, 2c, 2d, 3, 4a, 4b, 4c and 5. Thus in the notation used, passes 1a and 1b are aligned with each other and are separated by an unmilled area in the proximity of the obstacle OB1 which is to be avoided. It is noted that in avoiding the obstacle OB1, the milling machine operator will raise the milling drum as the milling machine passes over the object OB1 and then lower the milling drum to begin the milling pass 1b.

It is also noted as seen in milling pass 5, that it is possible for the milling machine operator to avoid obstacles by steering around them, as is apparent in the jog near the lower end of milling pass 5 where the milling machine operator has steered the milling machine to avoid the obstacle OB2. Depending upon the design of the milling machine it may be possible for the operator to take other actions to avoid contact of the milling drum with the obstacle; for example in some machines the operator may have the capability of shifting the milling drum sideways to avoid the obstacle.

It is noted that in making each pass, there will also be a starting line and a finish line where it is desired to begin and end the milling operation, and the area on the other side of either the starting line or the finish line may be treated as an area to be avoided during the milling operation. For example, the straight line 60 defines the starting line for pass 1a, pass 3 and pass 5, and it defines the finish line for passes 2d and 4c. At the lower end of FIG. 1 the straight line 62 may be defined as the finish line for pass 5 and as the starting line for passes 4a and 2a. Accordingly, the area above line 60 may be identified as obstacle OB8, and the area below line 62 may be identified as obstacle OB9.

It is also noted that FIG. 1 illustrates that the areas associated with each object will include a clearance around the object so as to provide a margin of safety in avoiding collision between the milling drum 16 and the various obstacles. For example, with regard to obstacle OB1 which is a rectangular shaped drain grate, there is an associated area A1 defined around the obstacle OB1 which provides a clearance C1 around the obstacle OB1. The manner of establishing these clearances in order to determine the area around each obstacle is further described below.

There are several aspects to the present system which permit the milling machine operator to efficiently mill within a close proximity of the various obstacles presented in the roadway while avoiding collision of the milling drum with those obstacles. First, it is necessary to determine the location of the milling drum in the reference system (X, Y, Z). Second, it is necessary to know the location of the various areas to be avoided in the reference system (X, Y, Z). Third, there must be a comparison of the drum location to the location of the areas to be avoided. Finally, information indicating the proximity of the milling drum to the various areas to be avoided is communicated to the milling machine operator so that the operator can then react in an appropriate manner to either lift and lower the milling drum at appropriate times or to steer the milling machine so as to avoid the obstacles, or alternatively a control signal is generated to automatically stop the milling machine and/or automatically raise the milling drum.

The determination of the location of the milling drum 16 in the reference system (X, Y, Z) is performed by the milling drum location detection system 42 previously noted. As schematically illustrated in FIG. 5, the two DGNSS sensors S1 and S2 located on the milling machine 10 receive signals from the satellite system and can determine their positions in the X, Y plane as schematically illustrated in FIG. 5. Thus the sensor S1 is located at coordinates XS1 and YS1 as indicated in FIG. 5. Similarly the coordinates of receiver S2 are located at XS2 and YS2. By knowing the positions of the two sensors S1 and S2, the position of any point on the milling machine 10 can be determined. Thus, with a milling machine 10 of the type shown in FIGS. 2 and 3 where the milling drum 16 is fixed in position relative to the frame 14 of the milling machine 10, the position of the milling drum 16 is known from the positions of sensors S1 and S2 and from the geometry of the milling machine 10 and the location of the milling drum 16 thereon.

Then to know the vertical location of the milling drum 16 relative to the surface 20 being milled, it is necessary to know the milling depth 18. The milling depth 18 may be determined in a variety of known ways, many of which are illustrated and described in detail in U.S. Pat. No. 8,246,270 to Berning et al., and assigned to the assignee of the present invention, the details of which are incorporated herein by reference.

Figure 2A:
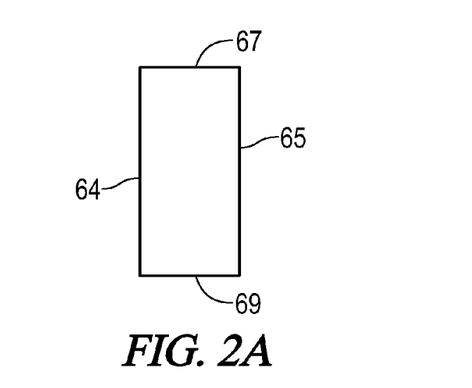
FIG. 2A is a schematic plan view of the footprint of the milling drum of FIG. 2 where the milling drum intersects the ground surface.
Figure 3A:
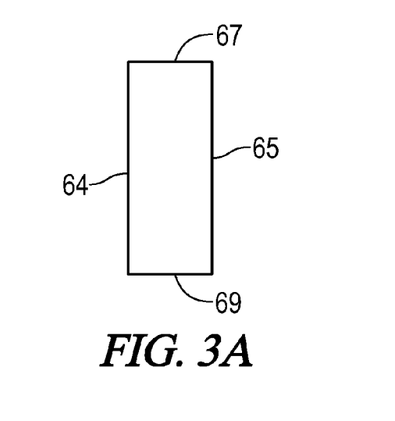
FIG. 3A is a schematic plan view of the footprint of the milling drum of FIG. 3 where the milling drum intersects the ground surface. It is noted that the length of the footprint in the direction of travel is shorter in FIG. 3A than in FIG. 2A.

As previously noted the portion of the milling drum 16 of most interest is the footprint of the intersection of the milling drum with the ground surface. As seen in FIGS. 2A and 3A, the footprint is generally rectangular in shape and includes a forward cutting line 64, a rearward cutting line 65, and two side lines 67 and 69. The particular location on the milling drum 16 of interest when advancing in the forward direction is the forward cutting line 64 where the milling teeth 16A of milling drum 16 intersect the surface 20 being milled. Also of interest in the situation where the milling drum is being lowered back into milling engagement with the ground is the rearward cutting line 65. Also of interest in a machine which can shift the milling drum 16 laterally are the side lines 67 and 69. Because the obstacles are generally located flush with the ground surface it is the intersection of the milling drum with the ground surface that is of the most interest.

It will be appreciated in comparing FIGS. 2 and 3 that as the milling depth 18 changes, the location of the forward cutting line 64 and rearward cutting line 65 relative to the positions of the sensors S1 and S2 on the frame 14 of milling machine 10 varies. The cutting footprint of the milling drum at the ground surface is rectangular in shape as seen in FIGS. 2A and 3A, and the cutting length of the rectangle in the direction of travel represented by side lines 67 and 69 increases as the milling depth increases.

By knowing the position of sensors S1 and S2 in the coordinate system (X, Y, Z) and knowing the geometry of the milling machine 10 and the value of the milling depth 18, the controller 48 can determine the location of the forward cutting line 64 and the rearward cutting line 65 of milling drum 16 in the coordinate system (X, Y, Z). Thus the milling drum location detection system 42 and controller 48 determine the drum location of milling drum 16. This drum location will move in the coordinate system (X, Y, Z) as the milling machine 10 moves in the coordinate system (X, Y, Z).

Identifying Locations of Obstacles

Figure 6:
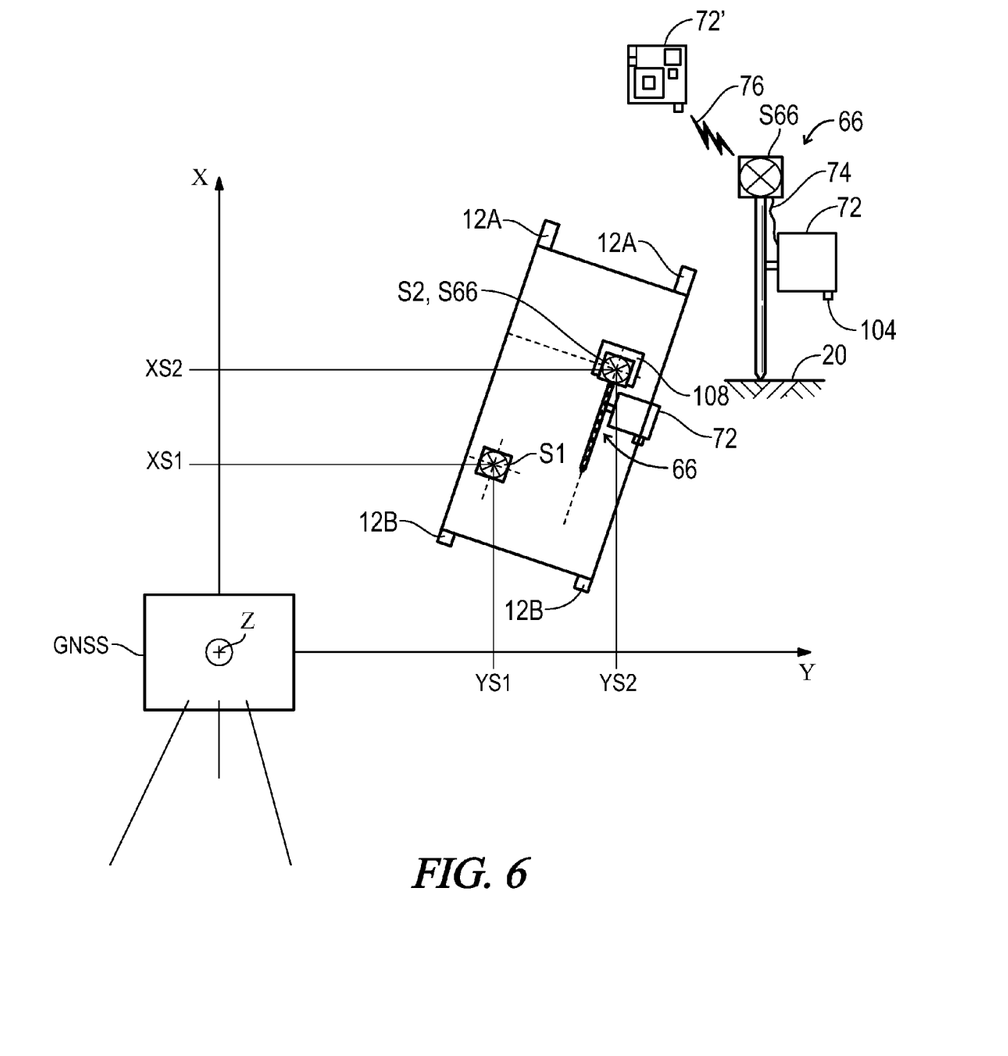
FIG. 6 is a schematic plan view similar to FIG. 5 of an alternative embodiment of the milling machine in which the rover can be detachably mounted on the milling machine and can serve as a part of the milling drum location detection system of the milling machine. The rover is shown in both its attached and detached positions.

Another aspect of the present invention is the identification of the location within the reference system (X, Y, Z) of the various obstacles or areas to be avoided and the inputting of that information into the memory 52 of the controller 48. One preferred manner of gathering that information is through the use of a field rover 66 which is schematically illustrated in FIGS. 5 and 6. The rover 66 includes a rod 68. A lower end 70 of the rod is placed on a location on the ground surface 20 for which the DGNSS coordinates are to be determined. A DGNSS receiver S66 is located at the upper end of the rod 68 and may be connected to a rover control unit 72 via electrical connection 74. Optionally, the rover control unit may be embodied as a separate hand held control unit 72' connected via wireless connection 76 to the receiver S66 as indicated in FIG. 5.

Figure 8:
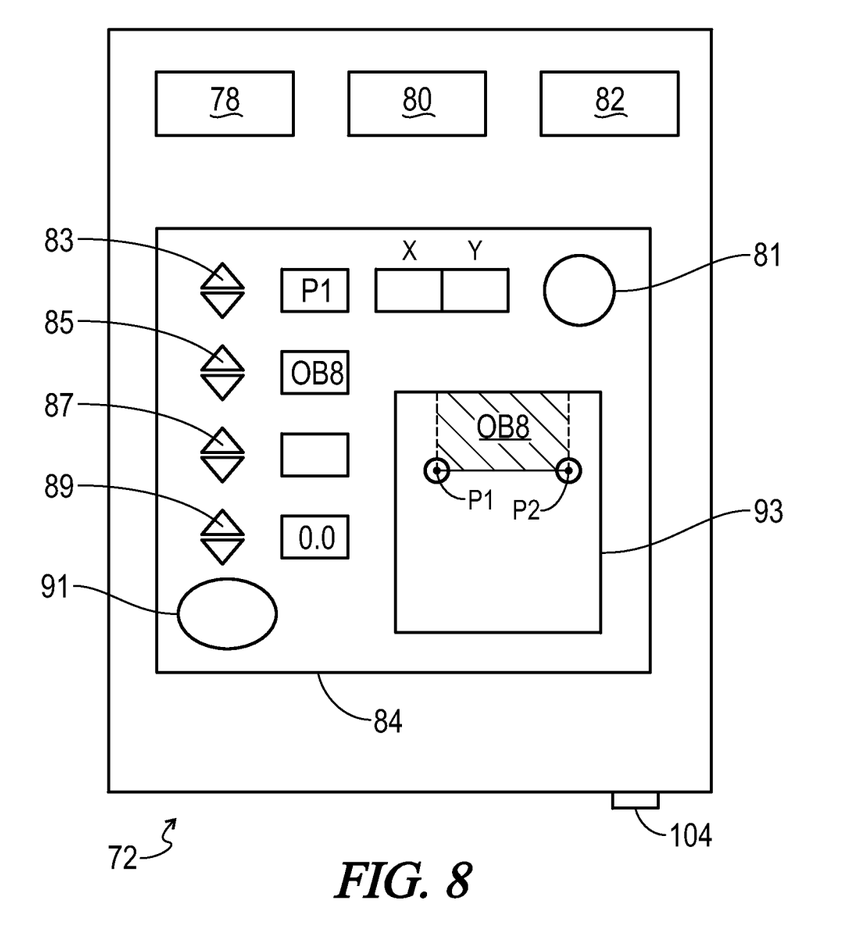
FIG. 8 is a schematic view of a control and display panel of the rover.

The rover control unit 72 is schematically shown in FIG. 8, and includes a rover position data determination component 78 which receives signals from the DGNSS receiver S66 to determine position data to define the position of the field rover 66 in relation to the independent reference system (X, Y, Z). The field rover 66 may also include a radio 80 for communicating with a DGNSS base station, and a battery 82 to provide power.

The rover 66 may also be constructed for use with any of the other suitable location technologies. For example, the DGNSS receiver S66 may be replaced with a prism for use with a total station. Other satellite based location technologies may be also used.

The rover control unit 72 includes an input system 84 such as a keyboard or touch screen which allows the operator of the rover to enter various parameters related to the data being gathered with the rover.

The input system 84 may include a point selector 83, an object identification selector 85, an object shape selector 87, and an object clearance selector 89. Each selector includes a set of toggle keys and an associated display window. A read button 81 may instruct the rover to take a co-ordinate reading via sensor S66. A store button 91 can enter selected values.

The point selector 83 can assign a point identifier such as P1 to a reading. The object identification selector 85 may allow selection of object identifiers such as OB1, OB2, etc. for the object with which the point is to be associated. The shape selector 87 allows the operator to identify the shape of the object, such as "LINE", "CIRCLE", "POLYGON", etc. The clearance selector 89 allows a value for the clearance around the object to be entered if desired. A display screen 93 can display the surveyed points and the associated object.

The operator of the rover 66 may utilize the rover to gather information identifying the location of the various obstacles, or areas surrounding the obstacles which are to be avoided, in the following manner. In the example shown in FIG. 8, the operator of the rover 66 has identified the location of the starting line 60 by placing the lower end 70 of the rover 66 at point P1 and recording the location of point P1 in the reference system (X, Y, Z), and then placing the rover at point P2 and recording the location of point P2 in the reference system (X, Y, Z). Then via the input system 84 the rover operator has indicated that a straight line is to be drawn between points P1 and P2 and that the milling machine is to avoid all area above the straight line as seen in FIG. 1, which area is identified as obstacle OB8.

It is noted that any of the data manipulation such as that just described for identifying the straight line 60 may be done either in the control unit 72 of the rover 66 or in the control unit 48 of the milling machine 10. It will be understood that the rover control unit 72 and the milling machine control unit 48 can have redundant or complementary capabilities and may be used together as appropriate.

As another example, to identify the location of obstacle OB1 the rover 66 may be placed at points P3, P4, P5 and P6 which are the corners of the four sided obstacle OB1. Once the locations of the corners are identified, the rover operator may indicate via selector 87 that the obstacle OB1 is defined as a four sided polygon defined by those four corners.

As seen in FIG. 1, when the milling machine 10 approaches obstacle OB1 during pass 1a, it is desired that a clearance C1 be established around the boundaries of the obstacle OB1. A value for the clearance C1 may be selected either by the operator of the rover 66 and input via selector 89 of input 84 of rover control unit 72, or it may be input by the operator of milling machine 10 through the use of the milling machine controller 48.

Figure 7:
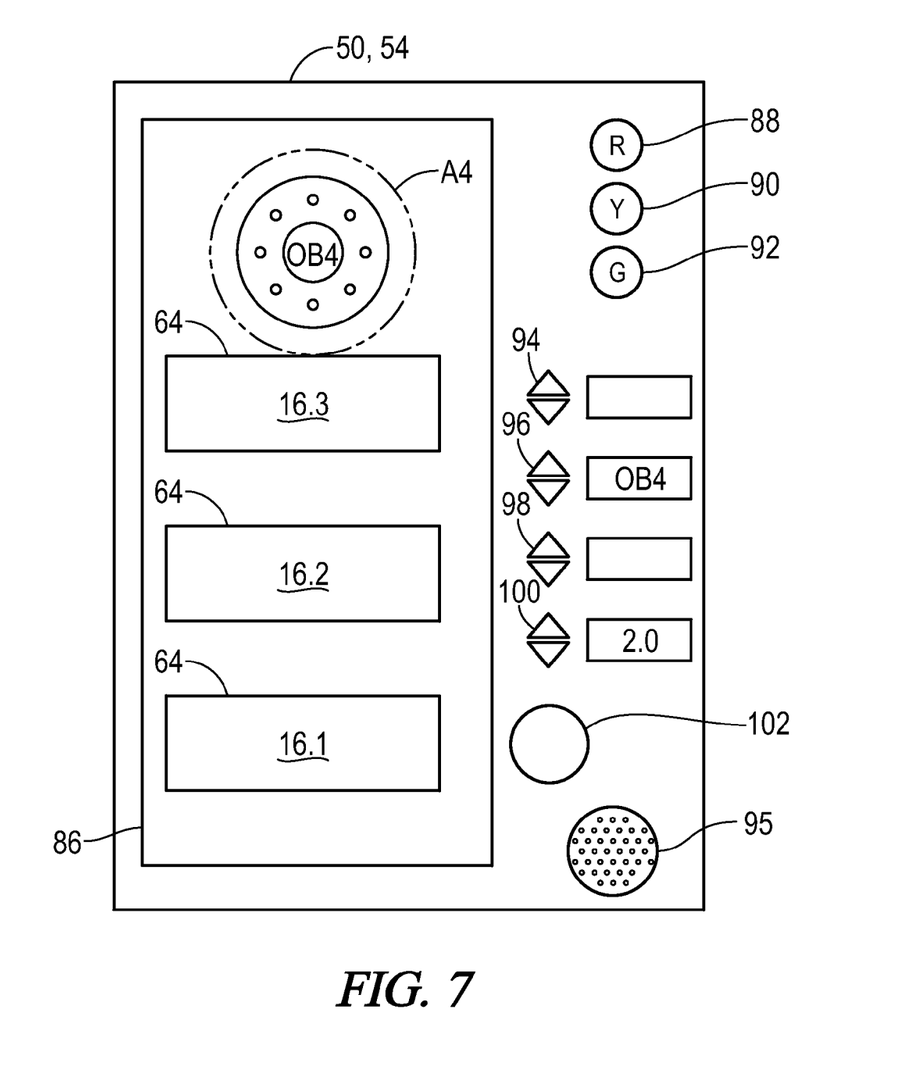
FIG. 7 is a schematic view of a control and display panel of the milling machines of FIGS. 2-6.

As previously noted, the milling machine controller 48 may include a display and input system 54 schematically shown in greater detail in FIG. 7. The display and input system 54 may include a display screen 86 which includes a graphic visual display depicting the proximity of the milling drum 16 to the location of the various areas, such as A4, to be avoided.

Additionally, the display and input station 54 may include other visual and audio means of providing indications to the milling machine operator of the proximity of the milling drum 16 to an area to be avoided. For example, as seen in the upper right corner of FIG. 7, the display and input station 54 may include a series of colored lights including red light 88, yellow light 90 and green light 92. Thus, a green indicator light being illuminated may indicate that there is no obstacle near to the drum, the yellow light 90 being illuminated may indicate that the drum is approaching an obstacle, and the red light 88 may indicate that the drum has reached an area to be avoided and that milling must stop and the drum must be raised.

For example, the view shown in the display screen 86 on FIG. 7 schematically depicts three sequential locations 16.1, 16.2 and 16.3 of the milling drum 16 as the milling machine 10 is moving along milling pass 4a seen in FIG. 1 and approaching the manhole cover OB4.

In the first position 16.1, the green light 92 may be illuminated because of the large distance from the nearest obstacle OB4 to the drum 16. As the drum 16 moves to the position 16.2, the yellow light 90 may illuminate. When the drum reaches the location 16.3 where the forward cutting edge 64 of the drum 16 touches the area A4 to be avoided, the red indicator light 88 may illuminate.

The display and input station 54 may also include an audible indicator 95 which is a speaker which may emit a series of beeping tones of steadily increasing urgency as the milling drum 16 comes into the proximity of an obstacle and approaches closer to that obstacle.

The display and input station 54 may include a set of input controls similar to those described above for the rover input station 84. Thus the input station 54 may include point selector 94, object selector 96, shape selector 98, clearance selector 100, and store button 102, all of which function in a manner similar to that described above for the similar features of the rover input station 84.

Using either the rover input system 84 or the input system 54, the clearances such as clearance C1 for obstacle OB1 may be set which will in turn determine the boundaries of the area A1 around the obstacle OB1.

As another example, to identify the obstacle OB2, the location of the obstacle OB2 may be determined with the rover 66 by placing the lower end 70 of the rover 66 at points P7 through P11 and then defining the obstacle OB2 as the polygonal shape defined by those corners. Then a clearance C2 is input into the system for the obstacle OB2 which results in the definition of the five sided area A2 around the obstacle OB2.

Moving on to the circular obstacle OB3, its location may be identified in several ways. One way to identify the location of the circle is to identify the location of center point P12 using the rover 66. Then a radius R of the circle may be manually measured and input into the rover controller 72 with instructions to define the location of obstacle OB4 as a circle having a center at P12 with a radius R. Alternatively, the radius may be determined by using the rover to identify one additional point on the circumference of the circular object. Also, the location of the circular obstacle OB4 may be determined by placing the rover at a minimum of three points P13, P14 and P15 and instructing the controller that the three points P13, P14 and P15 lie on the circumference of a circle, with which data the controller 72 can determine the location of the entire circle. Then with any of these techniques for identifying the location of the circular obstacle OB4 a clearance C4 may be input which results in the complete definition of the circular area A4 to be avoided around the obstacle OB4.

Obstacles OB5, OB6 and OB7 illustrate another capability of the present system wherein a group of closely clustered objects may be treated collectively and a single area A5-7 may be defined surrounding all three of those objects.

First, the location of each of the objects OB5, OB6 and OB7 would be determined using the rover 66 in the manner previously described for similar shaped objects. Then the clearance around each of the objects OB5, OB6 and OB7 may be input into the system. The programming of the controller 66 or the controller 48 may compare the locations of the areas A5, A6 and A7 which would be individually defined around each of those objects, based upon the assigned clearances, and if it is determined that the clearances overlap or that the spacing between objects is within some predefined multiple of the clearances, then the software may define a single area A5-7 surrounding all three obstacles. This feature may be described as an automatic integration component of the clearance selection component so that if a separation between two areas to be avoided is less than a preset multiple of the combined clearances of the two areas, the two areas are combined into one larger area.

The clearance selectors 89 or 100 may be described as range selection components or clearance selection components. This clearance selection component as previously described is configured so that the machine operator may assign individual clearances to each obstacle or each area to be avoided. This clearance selection component may also be configured so that the operator may select a default clearance which is applied to all obstacles unless a specific individual clearance is assigned to a given selected obstacle.

Transfer Of Data

After the data identifying the locations of the various obstacles has been gathered with the rover 66, those data must be communicated to the controller 48 of the milling machine 10. This can occur in several ways.

One way of transferring information from the rover 66 to the controller 48 is to output the data at rover output 104 to a memory stick or other media. That memory stick or other media can then be carried to an input port 106 of controller 48 of milling machine 10 to input that data to the controller 48 where it will be stored in memory 52. Alternatively, the rover controller 72 can communicate with the milling machine controller 48 via wireless means 76.

Also, as shown in FIG. 6, the field rover 66 may be configured such that it is removably attachable to the milling machine 10 via docking unit 108 so that the sensor S66 of rover 66 actually functions as the second sensor S2 of milling machine 10, and the rover control unit 72 can either supplement or function as the milling machine control unit 48.

Comparing Locations—Setting Clearances—Communicating to Operator

Once the data identifying the location of the various obstacles are stored in the milling machine controller 48, the milling machine controller 48 can compare the location of drum 16 to the locations of the various areas to be avoided around the obstacles which have been identified.

As previously noted with regard to FIG. 7, the display and input station 54 provides various means for communicating to the operator of the milling machine 10 information regarding the proximity of the milling drum 16 to the location of the various areas such as area A4 which are to be avoided. Various visual and audible signals may be provided as previously described as the milling drum 16 approaches the area to be avoided. The milling drum operator will then raise the milling drum 16 at appropriate times so as to avoid the areas to be avoided and then lower the milling drum 16 back into milling engagement with the ground surface 20 after the area to be avoided has been passed.

Optionally the controller 48 may be configured to generate a control signal operable to automatically stop advancement of the milling machine 10 and/or automatically raise the milling drum if the drum location is within a selected range of the location of the area to be avoided.

As previously noted, the preferred comparison is to compare the location of the forward cutting line 64 of the milling drum to the locations of the areas around the various obstacles which are defined two dimensionally on the surface 20 of the ground which is to be milled. Thus, the milling drum location is defined to correspond to that portion of the milling drum, i.e. the forward cutting edge 64, which is at an elevation corresponding to the elevation of the location of the area which is to be avoided, all of which are assumed to be at the elevation of the ground surface 20.

Also, after the milling drum has been raised and is being lowered back into milling engagement with the ground, care must be taken to avoid hitting the obstacle with the rearward cutting line 65 of the milling drum during the lowering process. The determination of the location of the rearward cutting line 65 is performed in the same manner as described above for determining the location of the forward cutting line 64. One needs to know the location of the milling drum in X and Y co-ordinates, and one needs to know the milling depth of the milling drum. Because it will generally be desired to return the milling drum to the same milling depth that it was at prior to raising the drum to pass over the obstacle, the milling machine can be moved forward until the cutting footprint of the milling drum at the desired milling depth clears the area to be avoided, then the milling drum can be lowered vertically downward until it again reaches the desired milling depth.

There are a number of issues to consider when setting the clearance around any particular obstacle to be avoided. This in part relates to the degree of accuracy with which the locations are determinable within the external reference system reference system (X, Y, Z). If for example a DGNSS system is being utilized and it is expected that the accuracy of the measured locations is within 1 inch, then a clearance of 1 inch or perhaps 2 inches might be selected.

If a less accurate positioning system is utilized such as GNSS then the clearance must be selected in accordance with the expected accuracy of that location data. If for example a GNSS system had an expected accuracy in the range of 2-4 inches, then a clearance of 5 inches might be selected around each of the obstacles.

Also, depending upon the nature of the obstacle or area to be avoided, a different clearance might be utilized. For example, if the area to be avoided is simply one side of the starting line 60, such that there is actually no obstacle which might be struck by the milling drum which would cause damage to the milling drum, then a clearance of zero may be utilized. On the other hand, if the obstacle is a fiberglass manhole cover which could be damaged simply by vibration of the ground in the vicinity of the manhole cover, a much larger clearance such as for example 10 inches might be selected so that in addition to avoiding physical impact of the milling drum with the obstacle some additional clearance is provided to avoid damage to the article due to the action of the milling drum in the general vicinity of the article.

Also, the possibility should be noted of obstacles that are actually protruding above the surface being milled. This could occur for example when a large amount of material is to be milled from a surface and the milling operation is performed in two passes. Thus if for example it was desired to mill 20 inches from a road surface, a first machine might make a first pass and mill 10 inches from the surface, followed by a second machine milling an additional 10 inches. Or one machine might make two sequential passes. The first machine would initially encounter the various obstacles in a situation where the obstacles were substantially flush with the road surface. However, the second milling machine, or the second pass of a single machine, would approach those obstacles in the context where the obstacles would actually be protruding 10 inches above the surface which is presently being milled by the second machine. That situation can be accommodated by the controller 48 by increasing the clearances around the obstacles or by simply treating the milling drum of the second milling machine as milling at a depth of 20 inches below the initial ground surface.

Operation of the System

Referring now to FIG. 1, the general operation of the system and its use by the milling machine operator will be described, beginning with milling pass 1a which starts at the start line 60.

The first area to be avoided has been defined as the area OB8 above the start line 60 in FIG. 1. Thus the milling machine operator lowers the milling drum 60 into the ground so as to begin the cut at starting line 60. The machine is moving in the direction of arrow 110. The machine advances until the machine reaches the area A1 surround obstacle OB1. Then the advance of the milling machine is stopped and the milling drum is raised. Then the machine advances and the raised milling drum passes over the area A1 to a location where the rearward milling line 65 (at desired milling depth) will be clear of the area A1. Then the milling drum is lowered back into milling engagement with the ground surface 20 to begin the second milling pass 1b. It is noted that the area separating pass 1a and pass 1b remains un-milled.

The milling pass 1b continues in the direction of the arrow until the location of forward cutting edge 64 of milling drum 16 reaches point P20 intersecting the outer boundary of area A2 at which point the machine operator will again raise the milling drum. Now, because the milling machine is near the finish line 62, the milling machine will skip over the entire area A2 and the milling machine will be steered through a U-turn and will begin the milling pass 2a from bottom to top as shown in the lower right corner of FIG. 1. The milling operation will continue until the milling machine approaches the area A3 around obstacle OB3, at which time the drum will be raised and pass over the area A3 and then will be lowered to begin the milling pass 2b. The milling pass 2b will continue until the forward cutting edge of the drum 64 reaches the boundary of area A4 at which time the milling drum is again raised and the milling machine continues forward and then lowers the milling drum to begin pass 2c. Pass 2c will continue until the milling drum approaches area A5-7 at which point the milling drum is again raised and then lowered to perform milling pass 2d which terminates when the milling drum reaches the start/finish line 60. The milling drum is again raised and the milling machine does a U-turn and then begins the third pass 3 beginning at starting line 60 and continuing until the milling drum intersects area A2 again at point P21. The milling drum is then raised and the milling machine makes another U-turn and begins pass 4a. The drum is raised at the end of pass 4a to pass over the area A4 again, then pass 4b is performed. The milling drum is again raised to pass over area A5-7, and then again lowered to perform pass 4c.

When the milling drum reaches the start/finish line 60 again, the milling drum is raised and the milling machine does another U-turn and begins pass number 5. It is noted that during pass 5 when the milling machine reaches the vicinity of area A2, the driver can see the profile of the area A2 on the display screen 86 and may use his own subjective judgment to steer around the area A2 as is indicated by the jog in milling pass 5 shown in FIG. 1.

It will be appreciated that after the milling passes 1-5 described above, there are a number of un-milled areas left in the general vicinity of the various areas A1, A2, A3, A4 and A5-7 which were avoided. These un-milled areas are much larger than the actual areas to be avoided, because the large milling machine mills in substantially straight paths and the entire milling drum skips over the obstacle thus leaving an area the entire width of the milling drum which is un-milled. These un-milled areas must then later be milled by a smaller, more maneuverable milling machine which can mill right up to the boundaries of the various obstacles. Another feature of the system described herein, is that the controller 48 will contain all of the data necessary to create a record of these un-milled areas.

The controller 48 can have the location of the roadway itself input into the system. As previously described, the locations of each of the obstacles are input into the system. Then the controller may track and record the location of each of the milling paths through use of the DGNSS sensors S1 and S2 which can monitor the continuous path of the milling machine. The controller 48 can also record data indicating when the milling drum 16 is raised out of milling engagement and then lowered back into milling engagement. With that information, the controller 48 can identify all of the un-milled areas and can also identify the locations of the obstacles within those un-milled areas. This information can then be used to generate milling instructions which could automatically guide a smaller milling machine to mill the various un-milled areas around each of the obstacles. This capability of the controller may be described as a remainder determination component configured to record a path milled by the milling drum, the locations of the areas to be avoided and the locations of un-milled areas corresponding to locations where the milling drum is raised to avoid the areas to be avoided, so that a record is provided of locations of areas remaining to be milled after passage of the milling machine apparatus.

The present system also provides methods of milling a ground surface. Such a method may comprise the steps of:

(a) storing in the controller 48 information identifying in the external reference system (X, Y, Z) the locations of one or more areas to be avoided;

(b) advancing the milling machine 10;

(c) determining a drum location of the milling drum 16 of milling machine 10 in the external reference system (X, Y, Z) as the milling machine 10 advances;

(d) comparing in the controller 48 the drum location of milling drum 16 to the locations of the various areas to be avoided; and (e) providing from the controller 48 an output corresponding to a proximity of the drum location to the location of the areas to be avoided.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed with the scope and spirit of the present invention as defined by the appended claims.

What is claimed is:

1. A construction machine apparatus, comprising:
    a plurality of ground engaging supports;
    a machine frame supported from the ground engaging supports;
    a milling drum supported from the machine frame;
    a milling drum location detection system configured to determine a drum location of the milling drum in an external reference system; and
    a location indicator system, including:
        a memory configured to store information identifying a location of an area to be avoided in the external reference system; and
        a controller configured to compare the drum location to the location of the area to be avoided, and to provide an output corresponding to a proximity of the milling drum to the location of the area to be avoided.

2. The apparatus of claim 1, further comprising:
    a field rover including a rod having a lower end for placement on a ground surface and including a receiver mounted on the rod to gather the information identifying the location of the area to be avoided in the external reference system.

3. The apparatus of claim 2, wherein:
    the field rover is removably attachable to the milling machine and is configured such that when the field rover is attached to the milling machine the field rover comprises a part of the milling drum location detection system.

4. The apparatus of claim 2, wherein:
    the controller includes an input configured to receive from the field rover the information identifying the location of the area to be avoided.

5. The apparatus of claim 4, wherein:
    the input of the controller comprises a port for a memory stick.

6. The apparatus of claim 4, wherein:
    the input of the controller comprises a wireless input communicated with a wireless transmitter of the field rover.

7. The apparatus of claim 1, wherein:
    the milling drum location detection system is configured such that the drum location corresponds to a portion of the drum at an elevation corresponding to an elevation of the location of the area to be avoided.

8. The apparatus of claim 1, wherein:
    the milling drum location detection system is configured such that the drum location corresponds to a portion of the drum at an elevation corresponding to an elevation of a ground surface to be milled.

9. The apparatus of claim 8, wherein:
    the portion of the drum is a forward cutting line of the drum.

10. The apparatus of claim 8, wherein:
    the portion of the drum is a rearward cutting line of the drum.

11. The apparatus of claim 1, wherein:
    the location of the area to be avoided is one side of a straight line.

12. The apparatus of claim 11, wherein the straight line is a starting line for a milling operation.

13. The apparatus of claim 11, wherein the straight line is a finish line for a milling operation.

14. The apparatus of claim 1, wherein the area to be avoided is a circle.

15. The apparatus of claim 1, wherein the area to be avoided is a multi-sided shape defined by locations of multiple corners.

16. The apparatus of claim 1, wherein:
    the output of the controller includes an indication to a milling machine operator of the proximity of the milling drum to the location of the area to be avoided.

17. The apparatus of claim 16, wherein:
    the output of the controller includes a graphic visual display depicting the proximity of the milling drum to the location of the area to be avoided.

18. The apparatus of claim 16, wherein:
    the controller includes an audible warning indicator configured to provide an audible indication to the machine operator if the drum location is within a selected range of the location of the area to be avoided.

19. The apparatus of claim 16, wherein:
    the controller includes a visual warning indicator configured to provide a visual indication to the machine operator if the drum location is within a selected range of the location of the area to be avoided.

20. The apparatus of claim 1, wherein:
    the output of the controller includes a control signal to automatically stop advancement of the milling machine if the drum location is within a selected range of the location of the area to be avoided.

21. The apparatus of claim 1, wherein:
    the output of the controller includes a control signal to automatically raise the milling drum of the milling machine if the drum location is within a selected range of the location of the area to be avoided.

22. The apparatus of claim 1, wherein:
    the milling drum location detection system includes a GNSS receiver for decoding satellite signals from a global navigation satellite system.

23. The apparatus of claim 1, wherein:
    the milling drum location detection system includes a sensor belonging to a non-satellite measuring system for determining the drum location of the milling drum.

24. The apparatus of claim 1, wherein:
    the controller includes a range selection component configured so that an operator may select a default clearance for all areas to be avoided.

25. The apparatus of claim 24, wherein:
the range selection component is configured so that the operator may select individual clearances for any selected area to be avoided.

26. The apparatus of claim 1, wherein:
the controller includes a range selection component including an automatic integration component so that if a separation between two areas to be avoided is less than a preset multiple of combined clearances of the two areas, the two areas are combined into one larger area.

27. The apparatus of claim 1, wherein:
the controller includes a range selection component configured so that an operator may input an individual clearance for each area to be avoided.

28. The apparatus of claim 1, wherein:
the milling drum location detection system is configured to determine a milling depth of the milling drum and the milling drum location is an intersection of the milling drum with a ground surface being milled.

29. The apparatus of claim 1, wherein:
the controller includes a remainder determination component configured to record a path milled by the milling drum, the locations of the areas to be avoided and the locations of un-milled areas corresponding to locations where the milling drum is raised to avoid the areas to be avoided, so that a record is provided of locations of areas remaining to be milled after passage of the apparatus.

30. A method of milling a ground surface, the method comprising:
(a) storing in a controller information identifying in an external reference system a location of an area to be avoided;
(b) advancing a milling machine
(c) determining a drum location of a milling drum of the milling machine in the external reference system as the milling machine advances;
(d) comparing in the controller the drum location to the location of the area to be avoided; and
(e) providing from the controller an output corresponding to a proximity of the drum location to the location of the area to be avoided.

31. The method of claim 30, wherein step (a) further comprises:
identifying a location of an obstacle to be avoided;
setting a clearance around the object, and thereby identifying a location of an area to be avoided around the obstacle.

32. The method of claim 30, wherein step (c) further comprises:
determining the location of an intersection of a forward cutting line of the milling drum with the ground surface being milled.

33. The method of claim 30, further comprising:
raising the milling drum and passing the milling drum over the area to be avoided;
lowering the milling drum back into milling engagement with the ground surface; and
determining the location of an intersection of a rearward cutting line of the lowered milling drum with the ground surface.

34. The method of claim 30, wherein:
in step (e), the providing of an output includes providing an indication to a milling machine operator of the proximity of the milling drum to the location of the area to be avoided.

35. The method of claim 34, wherein step (e) further comprises:
providing to the milling machine operator a graphic visual display depicting the drum location relative to the location of the area to be avoided.

36. The method of claim 34, wherein step (e) further comprises:
providing to the milling machine operator an audible indication of the proximity of the drum location to the location of the area to be avoided.

37. The method of claim 30, wherein:
in step (e), the providing of an output includes providing a control signal to automatically stop advancement of the milling machine if the drum location is within a selected range of the location of the area to be avoided.

38. The method of claim 30, wherein:
in step (e), the providing of an output includes providing a control signal to automatically raise the milling machine if the drum location is within a selected range of the location of the area to be avoided.

39. The method of claim 30, wherein:
prior to step (a), the information identifying in an external reference system a location of an area to be avoided is gathered using a field rover including a rod having a lower end for placement on a ground surface and including a receiver mounted on the rod to gather the information.

* * * * *